United States Patent [19]
Moyer et al.

[11] Patent Number: 5,594,880
[45] Date of Patent: Jan. 14, 1997

[54] SYSTEM FOR EXECUTING A PLURALITY OF TASKS WITHIN AN INSTRUCTION IN DIFFERENT ORDERS DEPENDING UPON A CONDITIONAL VALUE

[75] Inventors: William C. Moyer, Dripping Springs; James B. Gullette; Kara B. Pepe, both of Austin, all of Tex.

[73] Assignee: Motorola Inc., Schaumburg, Ill.

[21] Appl. No.: 243,731

[22] Filed: May 17, 1994

Related U.S. Application Data

[63] Continuation of Ser. No. 837,470, Feb. 14, 1992, abandoned.

[51] Int. Cl.$^6$ .................................................... G06F 9/30
[52] U.S. Cl. .......................................... 395/595; 395/726
[58] Field of Search ................................. 395/375, 650, 395/726, 775

[56] References Cited

U.S. PATENT DOCUMENTS

| | | | |
|---|---|---|---|
| 3,699,526 | 10/1972 | Iskiyan et al. | 395/375 |
| 3,886,525 | 5/1975 | Brown et al. | 395/375 |
| 4,142,246 | 2/1979 | Fumihiko et al. | 395/775 |
| 4,336,602 | 6/1982 | Kruger | 395/400 |
| 4,354,227 | 10/1982 | Hays, Jr. et al. | 395/725 |
| 4,510,580 | 4/1985 | Blount | 395/425 |
| 4,594,657 | 6/1986 | Byrns | 395/725 |
| 4,604,694 | 8/1986 | Hough | 395/650 |
| 4,722,049 | 1/1988 | Lahti | 395/375 |
| 4,815,039 | 3/1989 | Tai et al. | 365/189.07 |
| 4,881,194 | 11/1989 | Sprague et al. | 395/375 |
| 4,933,901 | 6/1990 | Tai et al. | 365/189.07 |
| 5,088,048 | 2/1992 | Dixon et al. | 395/800 |
| 5,163,140 | 11/1992 | Stiles et al. | 395/375 |

OTHER PUBLICATIONS

Motorola 88200 Cache/Memory Management Unit User's Manual, Second Edition, Rev. 1, copyrighted 1988, pp.: front cover, 3–14, 4–3, 5–4 to 5–10, 5–36 to 5–62, 6–9.

Tanenbaum, Andrew S., "Operating Systems: Design and Implementation," 1987, Prentice–Hall International, Inc., p. 57.

Keith Diefendorff, "The 88110: A Superscalar Microprocessor with Graphics Support", (slides and transcript of speech presented at Microprocessor Forum on Nov. 6, 1991).

Keith Diefendorff, "The 88110: A Superscalar Microprocessor with Graphics Support", (preliminary slides provided Sep. 1991 for presentation at Microprocessor Forum on Nov. 6, 1991).

Keith Diefendorff and Michael Allen, "Organization of the Motorola 88110: A Superscalar RISC Microprocessor", Proceedings of Intl. Processing Society of Japan, Nov. 1991, pp. 77–87.

Keith Diefendorff and Michael Allen, "The Motorola 88110 Superscalar RISC Microprocessor", sent to publisher for publication in 1992 COMPCON Proceedings, to be published Feb. 24, 1992.

Keith Diefendorff and Michael Allen, "The Motorola 88110 Superscalar RISC Microprocessor", preliminary slides for presentation at COMPCON to be held on Feb. 24, 1992.

(List continued on next page.)

*Primary Examiner*—Richard L. Ellis
*Attorney, Agent, or Firm*—Susan C. Hill

[57] ABSTRACT

A method and apparatus for determining instruction execution ordering in a data processing system (10). In one form, a control bit (52) is used by data processing system (10) to determine whether a standard instruction or a modified instruction is executed. The standard instruction performs a read bus cycle following by a write bus cycle. The bus (12) must be locked between the read and the write cycles in order to maintain coherency in semaphore applications. The modified instruction performs a buffered write bus cycle following by a read bus cycle. The bus (12) does not need to be locked between the write and the read cycles in order to maintain coherency in semaphore applications. Not locking the bus (12) can increase bus bandwidth in some bus systems.

29 Claims, 3 Drawing Sheets

OTHER PUBLICATIONS

Keith Diefendorff and Michael Allen, "Organization of the Motorola 88110 Superscalar RISC Microprocessor", IEEE Micro, submitted to IEEE on Dec. 13, 1991 (not published yet).

Keith Diefendorff and Michael Allen, "Organization of the Motorola 88110 Superscalar RISC Microprocessor", IEEE Micro, submitted to IEEE on Jan. 21, 1992 in revised form (not published yet).

Cezzar, Ruknet, "The Design of a Processor Architecture Capable of Forward and Reverse Execution," IEEE Proceedings of Southeastcon '91, pp. 885–890, vol. 2, Apr. 7–10, 1991.

Intel, "iAPX 86/88, 186/188 User's Manual, Hardware Reference," pp. 1–5: to 1–7, 1–15 to 1–16, 1–26, 1–39, 1–49, 1985.

SYSTEM FOR EXECUTING A PLURALITY OF TASKS WITHIN AN INSTRUCTION IN DIFFERENT ORDERS DEPENDING UPON A CONDITIONAL VALUE

This application is a continuation of prior application Ser. No. 07/837,470, filed Feb. 14, 1992 now abandoned.

FIELD OF THE INVENTION

The present invention relates to data processing systems, and more particularly to access ordering in a data processing system.

BACKGROUND OF THE INVENTION

As microprocessor systems become more and more complex, new techniques are required to ensure the efficient use of system resources. For example, in many multi-processor systems, there are several microprocessors trying to share some of the same system resources, such as memory storage, a printer, or a port to a display screen. It is crucial in such multi-processor systems that the communication pathways or buses carrying information between the microprocessors and the system resources are used in the most efficient way possible.

Messages traveling from microprocessors to system resources across communication pathways are analogous to cars traveling from one part of town to another across roads. If the traffic on the communication pathway is not handled as efficiently as possible, the traffic will start to back up and congest the pathways. As a result, communications between microprocessors and system resources will slow down. This will cause the whole system to operate more slowly. If the congestion on the communication pathways is bad enough, like rush hour traffic, the whole microprocessor system can be brought to a slow creep.

Unlike cars, however, only one message at a time can be transferred across a microprocessor bus using conventional electrical conductors. Thus, only one microprocessor at a time can be in control of the bus and can send information to another microprocessor or system resource.

Microprocessors must arbitrate among themselves to determine which processor will win the arbitration and be in control of the bus. Only when a microprocessor has won arbitration and is thus the "bus master" can that microprocessor then send or receive information across the bus. Other microprocessors must wait their turn to become the bus master in order to send or receive information across the bus.

Aside from the need to efficiently utilize buses, the need also exists to efficiently share system resources, such as, for example, a printer. If multiple processors are sharing a printer, there must be a way to indicate which processor is currently using the resource and whether that processor is performing a function that must not be disturbed. Semaphores are used for this function in many multi-processor systems.

Semaphores are a type of flag or status indicator that reflects the present status of a system resource. Usually the status information in a semaphore indicates whether or not the system resource is presently being used. In some multi-processor systems, the semaphore may also include information about which microprocessor is using the resource, and possibly even the type of function being performed on the resource.

For example, a particular location in memory can be designated as the location of the semaphore for a printer resource. If any microprocessor wants to use the printer, that microprocessor must read the printer semaphore by reading that particular location in memory. The printer semaphore contains information on the status of the printer, such as whether the printer is currently being used. If the printer semaphore indicates that the printer is currently being used and is thus busy, the microprocessor must wait. The microprocessor can continue to poll the printer semaphore by periodically reading the printer semaphore to see if the printer is still being used or if it has become available.

Once the printer semaphore indicates that the printer is available, the waiting microprocessor writes to the printer semaphore to change its status to busy. The waiting microprocessor has thus effectively locked the printer resource for its own use. No other processors can use the printer while the printer's semaphore indicates that the printer is being used. Once the waiting processor has finished using the printer, it writes a new value to the printer semaphore location in order to change the printer semaphore to indicate that the printer is once again available.

There is a significant problem that arises in systems that use semaphores to allocate shared system resources. The problem arises when more than one microprocessor is polling the semaphore of a shared resource to see if the resource has become available yet. For example, assume microprocessor #1 and microprocessor #2 are both polling the printer semaphore. Microprocessor #1 is the first to read the printer semaphore after it has been changed to indicate that the printer is available. Microprocessor #2 now reads the printer semaphore and also learns that the printer is available. Neither microprocessor #1 nor microprocessor #2 is aware that another processor is competing for the use of the printer.

If microprocessor #1 receives an interrupt, microprocessor #1 must execute a software interrupt routine before resuming where it left off. Meanwhile, microprocessor #2 writes a value to the printer semaphore to indicate that the printer is now busy. Microprocessor #2 then proceeds to use the printer. Microprocessor #1 finishes its interrupt routine and resumes where it left off in its software program. Microprocessor #1 left off knowing that the printer was available. Microprocessor #1 thus writes a value to the printer semaphore to indicate that the printer is now busy and then proceeds to try to use the printer. But the printer is already being used by Microprocessor #2. Thus a collision results on the bus going to the printer. As a result, the printer is not able to correctly print out the information from either of the microprocessors.

One way to solve this problem is to lock the bus during the entire time it takes for a processor to perform both a read and a subsequent write to a semaphore in memory. "Locking" the bus means that the present bus master is the only processor that is allowed to use the bus for multiple bus cycles. Normally, arbitration for the bus occurs frequently so that all processors have a chance to use the bus at regular intervals. Locking the bus is performed so that no other processor has a chance to become the bus master and use the bus.

A processor that has won the bus arbitration and has become the bus master locks the bus before reading a semaphore. Because the bus is locked, no other processors can use the bus. The bus master processor then reads the semaphore from memory and determines if the system resource is available. If the resource is busy, the bus master processor releases the bus lock, and arbitration for a new bus master can take place. But if the resource is available, the bus master processor continues to keep the bus locked until the bus master processor is able to write a new value to the semaphore indicating that the system resource is now busy.

By locking the bus, only one processor at a time is able to read a semaphore, see that the system resource is available, and write back a value to the semaphore to indicate that the resource is now busy. Thus, locking the bus guarantees that only one processor at a time will actually use a system resource. Collisions on the bus are therefore avoided.

However, locking the bus has a very significant drawback. It may cause communications between other microprocessors and system resources to slow down considerably. And as a result, the whole system may operate much more slowly.

As an example, a problem may arise when a hierarchical bus structure utilizing multiple busses is used. If the bus master processor and the memory containing the semaphore are on buses that are very distant from one another, the bus master must continuously lock all of the buses between itself and the distant memory during both the read and the subsequent write to the semaphore. This is not a very effective use of the bus time, especially considering that an access to a semaphore is usually a very common access in a multi-processor system. Thus, locking the bus is not a very satisfactory solution.

SUMMARY OF THE INVENTION

The previously mentioned needs are fulfilled and other advantages achieved with the present invention. In one form, the present invention comprises an apparatus and method for determining access ordering in a data processing system. A data processing unit is capable of executing an instruction which has a plurality of steps.

The data processing unit has a first portion for controlling execution of the instruction. The data processing unit also has a second portion coupled to the first portion. The second portion has a first logic state and a second logic state. The second portion causes the first portion to execute the plurality of steps in a first order when the second portion is in the first logic state. And the second portion causes the first portion to execute the plurality of steps in a second order when the second portion is in the second logic state.

The present invention will be understood by one skilled in the art from the detailed description below in conjunction with the accompanying drawings.

DESCRIPTION OF THE PREFERRED EMBODIMENT

Instead of locking the bus, the present invention utilizes a different approach to guarantee that only one processor at a time will receive a semaphore value which indicates that a resource is available. The present invention thus ensures that only one processor at a time will try to use a resource. And because the present invention does not require any bus to be locked, the potential throughput on the busses in some multi-processor systems can be increased significantly.

Figure 1:
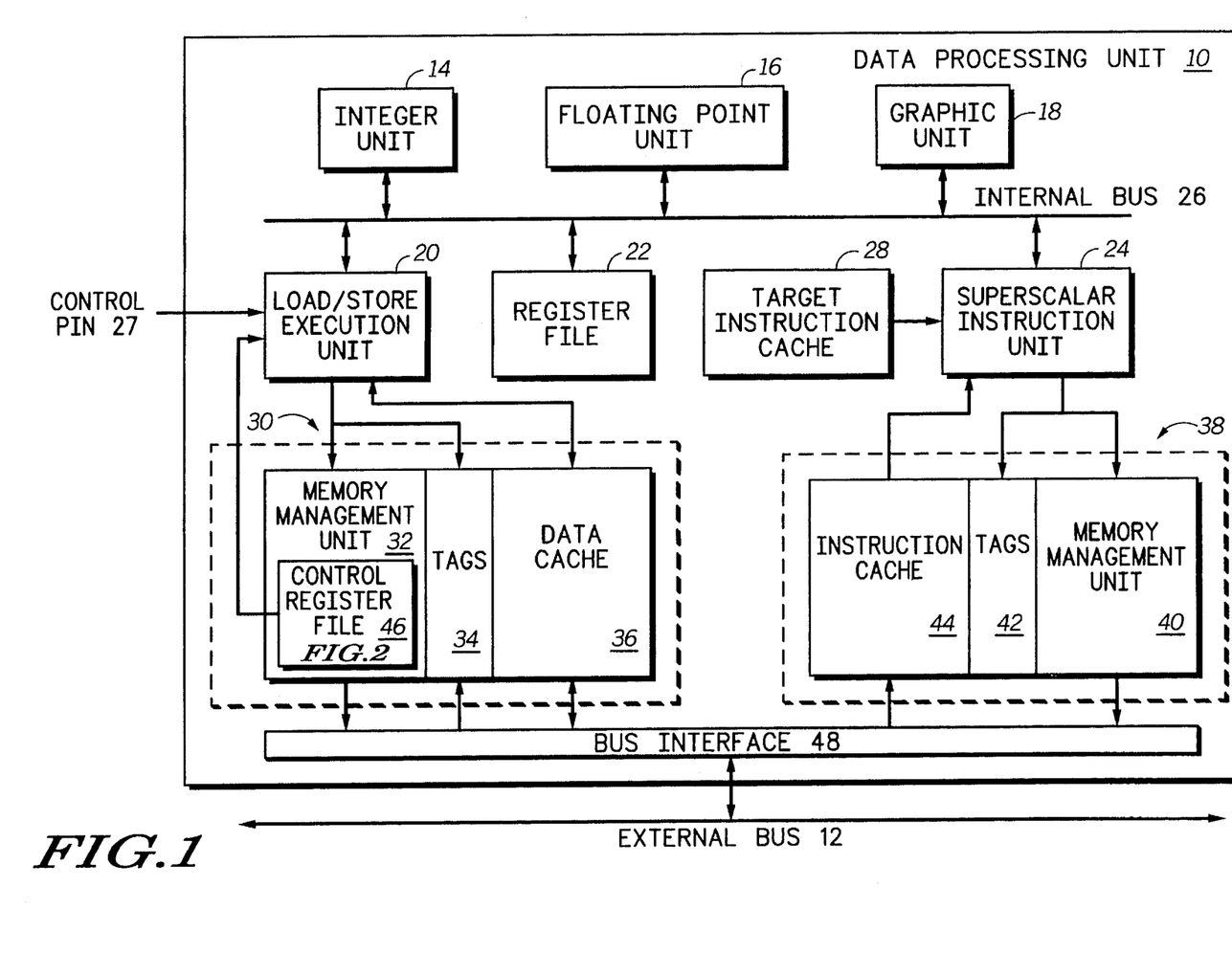
FIG. 1 illustrates, in block diagram form, a data processing system and a bus in accordance with one embodiment of the present invention.

FIG. 1 illustrates a data processing unit 10 connected to an external bus 12. Although the particular data processing unit 10 illustrated in FIG. 1 has a RISC (Reduced Instruction Set Computer) architecture, any architecture or type of data processing unit 10 could be used. Data processing unit 10 is capable of executing instructions designated by a user in a software program.

An integer unit 14, a floating point unit 16, a graphic unit 18, a load/store execution unit 20, a register file 22, and a superscalar instruction unit 24 are all bi-directionally connected to an internal bus 26. The load/store execution unit 20 is used to control the execution of instructions within the data processing unit 10. In some embodiments of the present invention, load/store execution unit 20 may receive an input from a control pin 27. The register file 22 contains information registers that can be used to store various types of data, such as for example, numerical values and addresses. A target instruction cache 28 is connected to the superscalar instruction unit 24 for transmitting information to the superscalar instruction unit 24.

"Memory management unit" may be abbreviated as "MMU". A data cache MMU 30 has a memory management unit 32, tags 34, and a data cache 36. All of the blocks within data cache MMU 30 can transfer information to any other block within data cache MMU 30. The tags 34 receive information from the load/store execution unit 20. The data cache 36 is bi-directionally connected to the load/store execution unit 20. An instruction cache MMU 38 has a memory management unit 40, tags 42, and an instruction cache 44. All of the blocks within instruction cache MMU 38 can transfer information to any other block within instruction cache MMU 38.

The tags 42 and the memory management unit 40 receive information from the superscalar instruction unit 24. The instruction cache 44 sends information to the superscalar instruction unit 24. Memory management unit 32 includes a control register file 46. Control register file 46 can be read, written, and programmed by a user using internal bus 26. The data path for reading and writing the control register file 46, using the internal bus 26, is through the load/store execution unit 20 and the data cache 36. Also, control register file 46 transmits control information to load/store execution unit 20.

A bus interface 48 is bi-directionally connected to data cache 36. Bus interface 48 receives information from memory management unit 32 and memory management unit 40. In addition, bus interface 48 send information to tags 34 and instruction cache 44. Bus interface 48 is also bi-directionally connected to the external bus 12.

Figure 2:
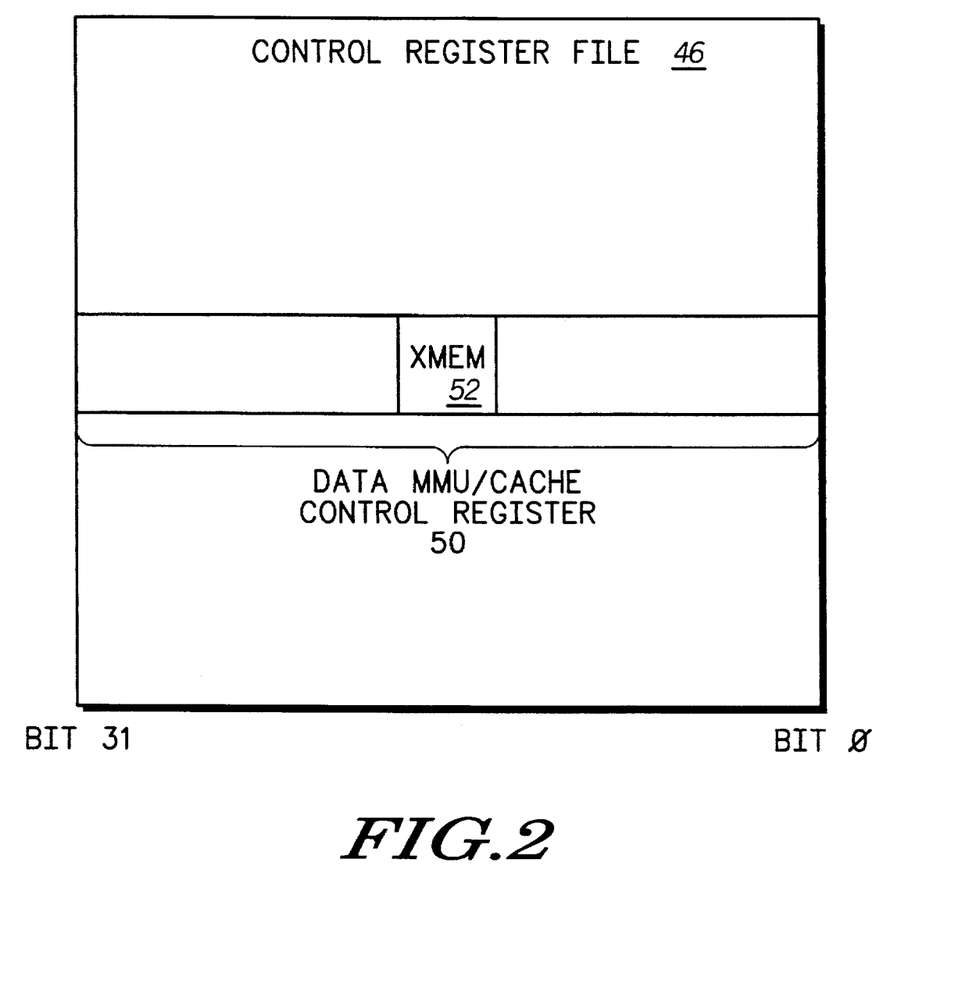
FIG. 2 illustrates, in block diagram form, a control register file of FIG. 1 in accordance with one embodiment of the present invention.

FIG. 2 illustrates one implementation of the control register file 46 of FIG. 1. Although the control register file 46 is shown to be thirty-two bits wide, other widths could be used. Also, although this embodiment shows the control register file 46 as part of the memory management unit 32, the control register file 46 could actually be located anywhere in data processing unit 10 having access to load/store execution unit 20. Control register file 46 contains several control registers of which only one, namely the data MMU/cache control register 50, is illustrated.

The data MMU/cache control register 50 will be referred to in this specification as control register 50. Control register 50 could have been located anywhere within control register file 46. In fact, control register 50 does not even have to be a part of control register file 46, but instead could be located elsewhere in data processing unit 10.

Control register 50 contains an XMEM (exchange register with memory) control bit 52 (not drawn to scale). In other embodiments, the XMEM control bit 52 could be located anywhere convenient in a storage device in data processing unit 10. The XMEM control bit 52 would not have to be located in a control register, although that is usually a convenient location. Although the XMEM control bit 52 is located at bit location thirteen of control register 50 in this embodiment, the XMEM control bit 52 could be located anywhere in control register 50. The other control bits located in control register 50 are not shown.

The advantages of the present invention are obtained primarily by the XMEM control bit 52 and the load/store execution unit 20, along with the associated logic which may be used in any data processing system. The operation of the XMEM control bit 52 and its associated logic will be discussed below.

Figure 3:
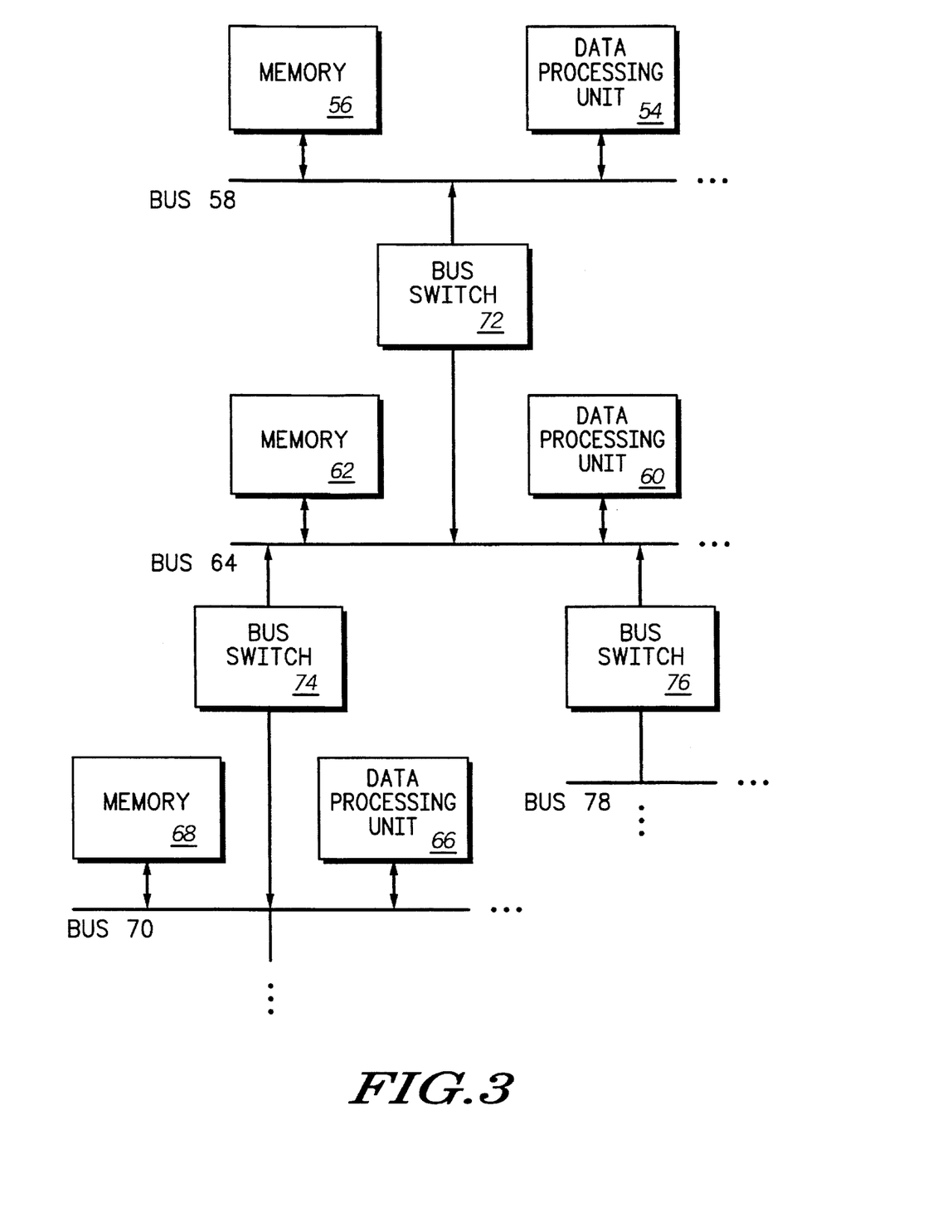
FIG. 3 illustrates, in block diagram form, a hierarchical bus system in accordance with one embodiment of the present invention.

FIG. 3 illustrates a multi-processor system using a hierarchical bus structure. Data processing units 54, 60, and 66 can each be any type of data processing unit that has the XMEM control bit 52 and its associated logic. For the sake of simplicity, it will be assumed that data processing units 54, 60, and 66 are all the same as data processing unit 10 from FIG. 1.

Data processing unit 54 and memory 56 are bi-directionally connected to bus 58. Data processing unit 60 and memory 62 are bi-directionally connected to bus 64. Data processing unit 66 and memory 68 are bi-directionally connected to bus 70. Bus 58 is bi-directionally coupled to bus 64 through bus switch 72. Bus 64 is bi-directionally coupled to bus 70 through bus switch 74. Bus 64 is bi-directionally coupled to bus 78 through bus switch 76.

A hierarchical bus structure, as illustrated in FIG. 3, is an arrangement of multiple local busses that can communicate with other busses through bus switches. The processors and other devices on the same local bus can communicate with each other using only their local bus. But if a processor wants to communicate with a device that is on another local bus, the information must be transferred between the two local busses by way of one or more bus switches and possibly other intermediate busses.

For example, if data processing unit 54 wants to read a location in memory 56, only the local bus, bus 58, is required to carry out the transfer. Data processing unit 54 first arbitrates for bus mastership of bus 58. Note that being the present bus master on a bus is the same as having "ownership" of that bus. Once data processing unit 54 has ownership of bus 58, data processing unit 54 merely sends an address to memory 56 across bus 58, along with a signal indicating that a read is to be performed. After accessing the appropriate memory location, memory 56 sends back the data contained in that memory location across bus 58. Only bus 58 is involved in this transfer of information.

But if data processing unit 54 wants to read a location in a more distant memory, such as memory 68, then busses 58, 64, and 70 are all required to carry out the transfer. Data processing unit 54 first arbitrates for bus mastership of bus 58. Then data processing unit 54 arbitrates for bus mastership of bus 64 through bus switch 72. Finally, data processing unit 54 arbitrates for bus mastership of bus 70 through bus switch 74. Note that data processing unit 54 is tying up the busses it has ownership of while it continues to try to win ownership of the remaining busses.

Data processing unit 54 must win ownership of all three busses, 58, 64, and 70, before it can send an address and read signal to memory 68 across the three busses. Once it receives an address and read signal, memory 68 internally accesses the memory location pointed to by the address. The ownership of all three busses is once again required in order for memory 68 to send back the data contained in the accessed memory location. All three busses, 58, 64, and 70, are involved in both the transfer of address information and the subsequent transfer of data information.

The advantages of the present invention will be described using the multi-processor system illustrated in FIG. 3. The benefits of not locking busses is most apparent in a multi-processor system which uses split bus transactions and/or pipelining. The busses 56, 64, and 70 will thus be considered to be both split-transaction and pipelined buses in the present embodiment.

A system which uses split bus transactions is one that allows different processors to have ownership of the address bus and data bus at the same time. This type of bus is called a split-transaction bus. As an example, when a split-transaction bus is used, microprocessor #1 can use the address bus at the same time that microprocessor #2 uses the data bus. In non-split-transaction buses, the same processor is the bus master of both the address bus and the data bus. Thus when non-split-transaction buses are used, ownership of the address bus and data bus cannot be split. Split-transaction busses are often used in multi-processor systems in order to increase the bandwidth of the busses.

A pipelined bus is a bus that allows the address phase of one transaction to overlap the data phase of another transaction. Many multi-processor busses combine split-transactions and pipelining in order to maximize information transfers on both the address bus and the data bus.

The XMEM control bit 52, illustrated in FIG. 2, is only used during one particular instruction, an XMEM (exchange register with memory) instruction. The XMEM instruction exchanges the contents of memory for the contents of a register located in register file 22 in FIG. 1. In other words, the XMEM instruction swaps the contents of a memory location with the contents of a register. If the memory location initially contains the value "X" and the register initially contains the value "Y", the XMEM instruction will swap their contents. After execution of the XMEM instruction, the memory location will contain the value "Y" and the register will contain the value "X". The XMEM instruction is received and executed in a conventional manner by portions of circuitry illustrated in FIG. 1.

The XMEM instruction is particularly useful in multiprocessor systems that use semaphores. A processor that wants to use a particular system resource reads the resource's semaphore to see if the resource is available. If the resource is not available, the processor continues to poll the semaphore by periodically reading the semaphore. Once the semaphore value indicates that the resource is available, the processor executes an XMEM instruction which first loads the present value of the semaphore into a register, and then writes a new value to the semaphore in order to indicate that the resource is now busy.

The processor then looks at the value of the semaphore that was loaded into the register in order to determine whether the resource is busy or available. If the semaphore indicates that the resource is available, the processor knows that the resource was available when it started its XMEM instruction. And because prior art devices required the bus to be locked during an XMEM instruction, the processor knows that no other processor has been able to access the semaphore between the read and the write portions of the XMEM instruction. The processor is therefore free to use the resource with the knowledge that no collision will result.

But if the semaphore loaded into the register during the XMEM instruction indicates that the resource is busy, the processor knows that the resource has been taken by another processor between the last polling read of the semaphore and the execution of the XMEM instruction. The processor thus knows not to use the resource, but to instead continue to poll the semaphore until it again indicates that the resource is available.

In prior art data processing units, an XMEM instruction for exchanging memory and register contents was accompanied by a bus lock signal on the bus that indicated when an XMEM operation was occurring. The memory and the bus arbitration logic used this bus lock signal to ensure that the read and subsequent write of the XMEM instruction were never interrupted by another processor obtaining ownership of the bus. The bus had to be locked during the XMEM instruction so that a processor could be guaranteed that the read and subsequent write of the XMEM instruction were performed as an indivisible pair. If any other processor was allowed to gain ownership of the bus between the read and the write portions of the XMEM instruction, then the XMEM would not be useful for semaphore transfers.

The present invention, however, does not require busses to be locked between the XMEM read bus cycle and the XMEM write bus cycle. Thus, the potential throughput of the busses in some bus environments is increased significantly. The XMEM instruction in prior art data processing units utilized a read (also called a "load") followed by a write (also called a "store"). The present invention allows the write portion of the XMEM instruction to be performed before the read portion. As a result, the bus does not need to be locked.

For example, referring to FIG. 3, assume that data processing unit 54 wants to access a semaphore located in memory 68. In prior art system, all three busses, 58, 64, and 70, had to be locked during both the read and subsequent write portion of an XMEM instruction. But the present invention allows the same XMEM instruction to be performed without the necessity of locking all three busses continuously for both the read and write portions of the XMEM instruction.

By performing the write portion of the XMEM instruction first, the busses do not have to be locked between the write and the read portions of the XMEM instruction. The bus signal that was used to lock the bus in prior art systems can instead be used merely to indicate that an XMEM instruction is currently being performed.

The new way of executing the XMEM instruction that performs the write before the read will be called the modified XMEM instruction. The use of the modified XMEM instruction in semaphore applications will now be described.

When the processor executes a modified XMEM instruction, the first bus cycle that occurs is a write to the memory location containing the semaphore. The processor always writes a value that indicates that the resource is busy. During the same write bus cycle, the processor also sends along a processor identification value so the memory knows which processor has begun the XMEM instruction. A bus signal can be used to indicate that an XMEM instruction is currently being performed. When the memory receives the write from the processor, the memory first loads the existing value of the semaphore into a buffer, and then writes the new value into the same memory location. The memory also stores the processor identification value with the buffered value of the semaphore so that the memory can return the proper semaphore value to the proper processor.

At this point in time, any processor that reads the semaphore will read a value that indicates that the resource is busy. And any processor that tries to execute an XMEM instruction will merely rewrite the same value into the semaphore that indicates that the resource is busy.

The important thing to note is that the semaphore value received by the second processor is the value previously written by the first processor: a value that indicates that the resource is busy. So if the read portion of the XMEM instruction for the second processor executes before that of the first processor, the memory will receive the second processor's identification value and will return the semaphore value for the second processor which indicates that the resource is busy. And when the read portion of the XMEM instruction for the first processor finally executes, the memory will receive the first processor's identification value and will return the buffered semaphore value which indicates that the resource is available. Thus only one processor at a time will ever receive a semaphore value indicating that the resource is available.

Again referring to FIG. 3, assume that data processing unit 54 wants to access a semaphore located in memory 68. Processor 54 executes a modified XMEM instruction. The first bus cycle is a write from data processing unit 54 to memory 68. Although data processing unit 54 must use all three busses, 58, 64, and 70, for the write, no bus lock is required. After the single bus cycle write, data processing unit 54 relinquishes ownership of the bus and other processors are free to use the bus. When data processor 54 arbitrates for the three busses and again regains ownership, the read portion of the XMEM instruction can be executed and the data processing unit receives back the proper value of the semaphore.

Again, the critical coherency is maintained because only one processor at a time will ever receive back a semaphore value that indicates that the resource is available. And this coherency is provided without the necessity, required by prior art systems, of locking the bus between the read portion and the write portion of the XMEM instruction.

Note that the modified XMEM instruction also requires that the write and read cycles be tagged in some manner to indicate which processor is executing the modified XMEM instruction. If this tagging is not done, then the system must ensure coherency by guaranteeing that the first processor that writes to the memory during an XMEM transfer is the only processor that reads and receives the initial semaphore value indicating that the resource was available. An XMEM transfer involves the steps occuring during an XMEM instruction, namely a read bus cycle and a write bus cycle in some order.

In addition, the present invention allows the user to determine whether the execution of the XMEM instruction will be performed as a standard XMEM instruction or as a modified XMEM instruction. The standard XMEM instruction, which is still required for many existing bus environments, executes a read cycle followed by a write cycle. The modified XMEM instruction, which is needed to improve bandwidth in split-transaction bus systems, executes a buffered write cycle followed by a read cycle.

In the present embodiment, the user uses a control register bit to determine whether the XMEM instruction will be performed as a standard XMEM instruction or as a modified XMEM instruction. The control bit used is the XMEM control bit 52 illustrated in FIG. 2. In the present embodiment, if the XMEM control bit 52 is a binary zero value, which corresponds to a digital logic state "zero", a standard XMEM instruction is performed. If the XMEM control bit 52 is a binary one value, which corresponds to a digital logic state "one", a modified XMEM instruction is performed.

Alternatively, in other embodiments of the present invention, control pin 27 can be used instead of XMEM control bit 52 as an alternate way to allow the user to select the type of XMEM instruction to be performed. By placing on control pin 27 either a voltage corresponding to a digital logic state "one" or a voltage corresponding to a digital logic state "zero", the user can select the type of XMEM instruction to be performed. As is shown in FIG. 1, the control pin 27 can be connected directly to the load/store execution unit 20. The pin may or may not be coupled to the external bus 12. Alternatively, the pin can be connected to the external bus 12 and the bus interface 48. In this alternate case, the load/store execution unit 20 can receive the control information from the pin by way of instruction cache 44, superscalar instruction unit 24, and internal bus 26.

Alternatively, in yet other embodiments of the present invention, a bit field of one or more bits within the binary encoding of the instruction itself can be used, instead of a control register bit, as an alternate way to allow the user to select the type of XMEM instruction to be performed. The instruction in one embodiment of the present embodiment consists of thirty-two bits arranged in a plurality of bit fields. In other embodiments, more or less than thirty-two total bits may be used. By placing the proper binary value in the proper bit field of the XMEM instruction, the user can select the type of XMEM instruction to be performed. For example, a bit field of one bit could be used with a binary zero value to represent a standard XMEM instruction, and a binary one value to represent a modified XMEM instruction.

Referring to FIG. 1, if a bit field within the XMEM instruction is used to select the ordering of the steps or tasks of the XMEM instruction, the XMEM instruction is still received by the data processing unit 10 in the same manner as other instructions. Like other instructions, the XMEM instruction is received by bus interface 48 from external bus 12. The various bit fields of the XMEM instruction are used in the same manner as the bit fields of other instructions, with the exception of the bit field used to select the ordering of the steps or tasks of the XMEM instruction. This task ordering bit field is transferred to the load/store execution unit 20 which is used to control the execution of instructions. In the present embodiment, the task ordering bit field is transferred to the load/store execution unit 20 by way of instruction cache 44, superscalar instruction unit 24, and internal bus 26.

In summation, the modified XMEM instruction allows the bandwidth of split-transaction busses to be potentially increased by doing away with the requirement of locking the busses during an XMEM transfer. The XMEM control bit 52 allows users to choose the XMEM instruction that is optimal for their system. Users that have systems with standard bus environments can choose the standard XMEM instruction. And users with split-transaction busses and more complex bus environments can choose the modified XMEM instruction. This software control allows the same data processing unit 10 to supply the needs of users utilizing very different bus environments. This software control also allows users to optimize the data processing unit 10 for their particular system.

It is important to note that the XMEM control bit 52 merely changes the ordering of the steps or tasks that are required to carry out the XMEM instruction. The same steps or tasks are always performed when the XMEM instruction is executed, regardless of the logic state of the XMEM control bit 52. Only the ordering of the steps or tasks is changed. Thus the result or outcome of the instruction is identical to the user. The outcome or result of both the standard and the modified XMEM instruction is the exchanging or swapping of the values in a register and a memory location. But the fact that the user can choose the ordering of the steps used to execute this instruction can result in a significant improvement in bus bandwidth in certain bus environments.

Although the present invention has been described in the context of a specific instruction, the XMEM instruction, the present invention could be used with any instruction that has more than one step or task. The present invention allows the user to change the ordering of the steps or tasks of an instruction. Although the XMEM instruction as presently discussed only has two possible orderings, other embodiments of the present invention may use multiple control bits in order to choose between multiple possible orderings of the steps or tasks of the chosen instruction.

While the present invention has been illustrated and described with reference to specific embodiments, further modifications and improvements will occur to those skilled in the art.

It is to be understood, therefore, that this invention is not limited to the particular forms illustrated and that it is intended in the appended claims to cover all modifications that do not depart from the spirit and scope of this invention.

What is claimed is:

1. A data processing unit for executing a software instruction, the software instruction having a multi-bit binary representation, the software instruction including a plurality of tasks, the data processing unit comprising:

a bus interface circuit for receiving the multi-bit binary representation of the software instruction from a bus;

an instruction storage circuit having a plurality of storage elements, a first one of the plurality of storage elements storing the multi-bit binary representation of the software instruction, said instruction storage circuit being coupled to said bus interface circuit;

control means for providing a control value; and execution means for controlling execution of the software instruction, during execution of the software instruction said execution means receives the multi-bit binary representation from said instruction storage circuit and receives the control value from said control means and, in response thereto, executes said plurality of tasks of the software instruction in a first order if the control value has a first value, and executes said plurality of tasks of the software instruction in a second order if the control value has a second value, said execution means being coupled to said instruction storage circuit and to said control means.

2. A data processing unit according to claim 1, wherein said control means comprises:

at least a portion of a user programmable control register.

3. A data processing unit according to claim 1, wherein said control means is a portion of the multi-bit binary representation of the software instruction.

4. A data processing unit according to claim 1, wherein said control means comprises:

an integrated circuit pin.

5. A method according to claim 1, wherein the software instruction has a mnemonic form of "XMEM".

6. A data processing unit according to claim 1, wherein the plurality of tasks includes a read task and a write task.

7. A data processing unit according to claim 6, wherein the data processing unit further comprises:
   a data register coupled to the bus interface circuit; and wherein the read task includes a read bus cycle which transfers a first data value from the bus to said data register, and wherein the write task includes a write bus cycle which transfers a second data value from said data register to the bus.

8. A data processing unit according to claim 7, wherein the first and second data values are semaphore values.

9. A data processing unit according to claim 7, wherein the read bus cycle and the write bus cycle each access a same memory location.

10. A data processing unit for executing a first software instruction having a first multi-bit binary representation and a second software instruction having a second multi-bit binary representation, the first software instruction having at least one task, the second software instruction having a plurality of tasks, the data processing unit comprising:
   a bus interface circuit for receiving, from a bus, the first multi-bit binary representation of the first software instruction and the second multi-bit binary representation of the second software instruction;
   an instruction storage circuit having a first element for storing the first multi-bit binary representation of the first software instruction and for simultaneously storing the second multi-bit binary representation of the second software instruction, said instruction storage circuit being coupled to said bus interface circuit;
   a control register, said control register having a register portion for storing a control value;
   a data register, coupled to said bus interface circuit; and
   execution means for controlling execution of the first software instruction and the second software instruction, during execution of the at least one task of the first software instruction said execution means decodes the first multi-bit binary representation and in response thereto causes the control value to be provided to and stored in the register portion, during execution of the second software instruction said execution means decodes the second multi-bit binary representation and receives the control value from the register portion and, in response thereto, executes said plurality of tasks in a first order if the control value has a first value and executes said plurality of tasks in a second order if the control value has a second value, said execution means being coupled to said instruction storage circuit and to said control register.

11. A method according to claim 10, wherein the second software instruction has a mnemonic form of "XMEM".

12. A data processing unit according to claim 10 wherein the first order of the plurality of tasks includes a read task followed by a write task, and wherein the second order of the plurality of tasks includes the write task followed by the read task.

13. A data processing unit according to claim 10, wherein the first value of the control value is a binary zero and the second value of the control value is a binary one.

14. A data processing unit according to claim 10, wherein the software instruction exchanges a first data value stored in said data register with a second data value stored in a memory location.

15. A data processing unit according to claim 14, wherein the first and second data values are semaphore values.

16. A method for determining an ordering of a plurality of tasks required to execute an instruction in a data processing unit, the method comprising the steps of:
   representing the instruction by way of a plurality of bit field values, a first one of the plurality of bit field values having a predetermined fixed value, a second one of the plurality of bit field values having a user determinable control value;
   selecting the user determinable control value for the second one of the plurality of bit field values;
   providing the plurality of bits field values to the data processing unit;
   if the control value has a first value, executing said plurality of tasks in a first order; and
   if the control value has a second value, executing said plurality of tasks in a second order.

17. The method according to claim 16 wherein the plurality of tasks includes a read bus cycle and a write bus cycle.

18. A method according to claim 16, wherein said step of executing said plurality of tasks in a first order comprises the step of:
   exchanging a first data value stored in a register with a second data value stored in a memory location; and
wherein said step of executing said plurality of tasks in a second order comprises the step of:
   exchanging the first data value stored in the register with the second data value stored in the memory location.

19. A method according to claim 18, wherein each of said steps of exchanging comprises the steps of:
   transferring the first data value by way of a split transaction bus; and
   transferring the second data value by way of the split transaction bus.

20. A method according to claim 19, wherein the split transaction bus is pipelineable.

21. A method according to claim 16, wherein said step of executing said plurality of tasks in a first order comprises the step of:
   performing a read access to a selected address before performing a write access to the selected address; and
wherein said step of executing said plurality of tasks in a second order comprises the step of:
   performing the write access to the selected address before performing the read access to the selected address.

22. A method according to claim 21, wherein each of said steps of performing comprises the step of:
   transferring data by way of a split transaction bus.

23. A method according to claim 21, further comprising the step of:
   storing a semaphore at the selected address.

24. A method according to claim 21, wherein the instruction has a mnemonic form of "XMEM".

25. A method for operating a data processing system, the data processing system having a first processor, a second processor, and a memory coupled to both the first and second processors by way of a bus, the memory having a memory storage circuit, the method comprising the steps of:
   determining a control value, the control value corresponding to an instruction;
   initiating execution of the instruction in the first processor;
   using the control value to select, as a selected ordering, one of a first ordering of a plurality of tasks for the instruction and a second ordering of the plurality of tasks for the instruction;

if the first ordering is selected, performing the following steps:

initiating a write bus cycle on the bus from the first processor to the memory;

transferring a new data value from the first processor to the memory by way of the bus during the write bus cycle;

transferring a first processor identification value from the first processor to the memory by way of the bus during the write bus cycle;

transferring an old data value from the memory storage circuit to a temporary storage circuit;

storing the first processor identification value so that it is associated with the old data value;

overwriting the old data value with the new data value so that the new data value is stored in the memory storage circuit;

after initiating the write bus cycle, initiating a read bus cycle on the bus from the memory to the first processor;

transferring the first processor identification value from the first processor to the memory by way of the bus during the read bus cycle; and     transferring the old data value from the temporary storage circuit to the first processor by way of the bus during the read bus cycle; and if the second ordering is selected, initiating the read bus cycle before initiating the write bus cycle.

26. A method according to claim 25, wherein the bus is a split transaction bus.

27. A method according to claim 25, wherein the instruction has a mnemonic form of "XMEM".

28. A method according to claim 25 wherein the old data value is an old semaphore value, and the new data value is a new semaphore value.

29. A method according to claim 25, wherein if the first ordering is selected, performing the following step:

after initiating the write bus cycle, but before initiating the read bus cycle, transferring the new data value from the memory to the second processor in response to a request by the second processor.

\* \* \* \* \*